Patented May 9, 1950

2,506,616

UNITED STATES PATENT OFFICE 2,506,616

OXIDATION OF ALKOXY HYDROCARBON SILANES

John B. Rust, Montclair, and Charles A. MacKenzie, Upper Montclair, N. J., assignors, by direct and mesne assignments, of one-half to Montclair Research Corporation, a corporation of New Jersey, and one-half to Ellis-Foster Company, a corporation of New Jersey No Drawing. Application May 29, 1945, Serial No. 596,594

19 Claims. (Cl. 260—2)

This invention relates to organosilicon derivatives containing hydrocarbon groups such as aliphatic, carbocyclic and alicyclic groups; to such organosilicon derivatives containing from one to three substituent hydrocarbon groups; and to process of making such products and compositions containing the same; and more particularly to polymeric derivatives thereof and methods of making such polymers.

Heretofore alkyl and aryl silicon derivatives have been made primarily by the action of alkyl and aryl magnesium halides on silicon halides with subsequent hydrolysis to form polymeric silicones and the like. It has also been reported that certain other metal alkyls such as zinc and mercury alkyls may be employed. Furthermore, the substituted silicon halides may be made by the above reaction with Grignard reagents and also by one-step processes wherein a halohydrocarbon is reacted with a silicon halide in the presence of metallic magnesium or lithium.

In such processes it was to some extent difficult to carry out polymerization of the silicones to produce products of controlled uniformity. This was due principally to the rapid reactivity of the silicon hydroxides and silicones in giving up water and forming polymeric materials. These polymeric materials ranged from limpid fluids to hard, infusible, insoluble resins of high heat stability. It has also been proposed to effect the polymerization of alkyl silicon derivatives by oxidizing cyclic alkyl silicon oxides (J. A. C. S., 63, 1124 (1941)) or by treating a cyclic aryl silicon oxide with water and acid at a high temperature. In both of these instances cyclic silicon oxides were used and polymerization was effected by oxidizing off the alkyl or aryl side chains.

It is an object of this invention to produce carbon silicon bonded materials by economic and simple methods.

Other objects include methods of producing polymeric silicon derivatives under controlled conditions.

Other objects include control of the process for the production of light colored alkyl or aryl silicon polymers which may still possess in the molecule certain unreacted alkoxy groups.

Another object is to produce linear polymeric derivatives which may subsequently be cured to hard, flexible or brittle resins by the application of heat.

Still further objects and advantages of the present invention will appear from the more detailed description set forth below, it being understood that such more detailed description is given by way of illustration and explanation only, and not by way of limitation, since various changes therein may be made by those skilled in the art without departing from the spirit and scope of the present invention.

In accordance with the present invention, alkoxy silicons, particularly alkoxy alkyl silicons, alkoxy aryl silicons, and alkoxy cyclic non-aromatic silicons, are subjected to the action of oxygen at elevated temperatures to produce new types of derivatives as well as novel polymers, due to the removal of alkoxy groups. The process is essentially one which comprises formation of the alkoxy silicons and subjecting these materials to oxidization by air, preferably by passing a stream of air in fine bubbles through the material heated to about 150° C. or higher, for example. In this way the alkoxy groups are removed as aldehydes, acids, etc. These reaction products may be recovered by distillation from the reaction mixture. The process can be carried out under strictly controlled conditions depending upon the rate at which air is introduced and the efficiency of mixing of the silicon derivatives with the air bubbles to enable control of the extent to which the reaction is carried. The reaction may be carried to the point where the alkoxy groups may be substantially entirely removed by this process, as in the case of di- and triaryl or alkyl alkoxy silicons or related compounds. However, in the case of monoalkyl or aryl alkoxy silicons the reaction may not be taken so far as to remove all of the groups and the liquids, solids, lacquers or plastics which result retain some proportion of the alkoxy groups in the latter event.

The temperature at which the reaction is carried out is of importance in determining the speed with which the alkoxy groups are removed. The temperature range may run up to the boiling point of the compound or mixed compounds treated, particularly if carried out under reflux; or higher temperatures may be employed if the reactions are carried out under pressure. Desirably, it is above 130° C. and preferably from 170–190° C. The reactions may be carried out in stages in which successively different temperatures are employed, as for example, where in a first stage a higher temperature range is employed followed by treatment at a lower temperature range, or vice versa.

The alkoxy materials used in the present invention may be those which are obtained from any desirable source. Such alkoxy derivatives may be individual compounds or mixtures of alkoxy derivatives such as mixtures of alkyl and aryl alkoxy derivatives, or of different alkyl or of different aryl derivatives, etc., or they may be the reaction mixtures containing the stated alkoxy derivatives without separating the latter from the reaction mass.

Examples will be given below of the preparation of alkoxy derivatives that may be utilized, but they may be obtained in any desirable way, as for example, by reaction of an alkyl such as ethyl orthosilicate with a Grignard reagent; or by the process of Andrianov wherein an alkyl halide is reacted with ethyl silicate in the presence of magnesium metal; or an alkyl or aryl silicon halide may first be formed by the Grignard reaction or the one-step processes from silicon halides such as silicon tetrahalides reacted with halohydrocarbons in the presence of metallic magnesium or lithium. The alkyl or aryl silicon halides thus formed may then be reacted with alcohols to produce the corresponding alkoxy aryl or alkoxy alkyl or alkoxy cyclic non-aromatic silicons.

Pure compounds either by themselves or in admixture may be used as indicated above, or the derivatives in partially polymeric condition may be employed.

As the hydrocarbon substituents attached to the silicon in the substituted silicon halides and tetra substituted silicons of the present invention, there may be used alkyl, aryl, olefinyl, alkenyl, alkynyl, arenyl and arynyl, alicyclic, cycloaromatic, aralkyl derivatives, as illustrated by methyl, ethyl, propyl, butyl, amyl, hexyl, heptyl, octyl, vinyl, allyl, butenyl, the radicals from acetylene, methyl acetylene, propyl acetylene, cyclohexyl, benzyl, phenyl, tolyl, xenyl, chlorphenyl, styryl, and radicals from such derivatives as phenylacetylene.

Whereas in the preferable practice, air is blown through the alkoxy silicon undergoing treatment, the latter is desirably in liquid condition. The alkoxy silicons which are liquid at the temperature at which the treatment is carried out, may thus be directly treated. If desired, solvents may be present and if by-reactions are to be avoided, the solvents should be such which are inert to the oxygen treatment to which the alkoxy derivative is being subjected. Solvents of this type may then be utilized to dissolve the alkoxy silicons which are to be subjected to the treatment referred to.

As the oxidizing agent, dry air is preferable, but pure oxygen or oxygen mixed with various inert gases, or ozone and even other oxidizing agents such as benzoyl peroxide, acetyl peroxide, and the like, may be employed. The oxidation may be carried out solely by bubbling air through the heated alkoxy silicon, or catalysts may be present, such catalysts for example as vanadium pentoxide, tin vanadate, and the like. But no catalysts are necessary in carrying out the reaction.

The products resulting from the oxidation treatment may be subjected to further heat treatment, as for example, in the absence of air, or they may be baked, particularly when used in the form of lacquers, films, or molded products. The type of treatment depends on the utilization that is being made, and also how far the oxidation treatment has been carried. The oxidation treatment may as indicated above, be carried out until the weight is reduced substantially without removing all of the alkoxy groups present, or until the alkoxy content is substantially reduced, or it may be carried to the point where polymeric materials are obtained. The resulting products are different from those prepared by other methods in view of the combinations which result from bonding of the substituents while the alkoxy groups are being removed.

The following examples illustrate various phases of the invention.

*Example 1.*—Mono n-butyl triethoxy silane was prepared by the following method. 24.3 g. magnesium turnings (1 mole) and 208 g. ethyl orthosilicate (1 mole) in 250 cc. anhydrous diethyl ether were placed in a 2 liter 3-neck flask fitted with a reflux condenser, protected by a calcium chloride drying tube, a stirrer, and a dropping funnel. Addition of 5 cc. n-butyl bromide and application of local heating soon started a vigorous reaction. Then over a period of 1¼ hours, 137 g. n-butyl bromide (1 mole) was slowly added maintaining a gentle refluxing of ether solvent due to the heat of reaction. All of the magnesium metal was used up and reaction solution became clear, dark-brown in color. Stirring was continued for two hours after final addition of butyl bromide whereupon a light gray grainy precipitate appeared as the reaction mixture cooled. The liquid was decanted off the salt and fractionated. There was obtained

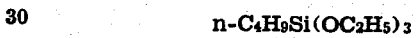

$$n-C_4H_9Si(OC_2H_5)_3$$

a clear, colorless pleasant smelling liquid boiling at 190–195° C.

11.5 g. of this material was heated for 10 hours at 170–180° C. while air, dried by passage through calcium chloride and concentrated sulfuric acid, was slowly bubbled through. The liquid thickened considerably and became very viscous. It now weighed 8 g., possessed an acid odor, and gave a flexible film on baking a thin layer on glass. Heating at 300° C. in absence of air for several hours gave a slight further thickening.

*Example 2.*—Partially polymerized diethyl diethoxy silane was prepared by refluxing ethyl alcohol with partially hydrolyzed diethyl dichloro silane, prepared by the one-step process. To 170 g. silicon tetrachloride (1 mole) 48.7 g. magnesium turnings (2 moles) and 1200 cc. anhydrous diethyl ether in a 3 liter, 3-neck flask fitted with a reflux condenser, protected by calcium chloride tube, stirrer, and dropping funnel, was slowly added 218 g. ethyl bromide (2 moles) with vigorous stirring. Reaction was initiated by local heating for a few minutes and was then kept under control by regulating addition of ethyl bromide. Stirring was continued for one hour after final addition. All of the magnesium was used up and a copious white grainy precipitate appeared. All of the liquid was then distilled off from the salt. The collected distillate was then fractionated to yield 105.8 g. $(C_2H_5)_2SiCl_2$, boiling mainly at 130–131° C. at 755 mm. or 67.5% of theory. This clear, colorless, fuming liquid was then exposed to the moisture of the air for several hours with occasional stirring until it had partially hydrolyzed and polymerized to a slightly less mobile, but still fuming liquid.

45 g. of this product was then refluxed for 45 minutes with 43 g. of absolute ethanol. The solution was fractionated, removing excess alcohol at 80–82° C. and several cc. of material boiling 234–268° C. The non-distillable residue, about 55–60 g. was a dark orange mobile liquid of pleasant odor.

15.9 g. of this material was then heated at 170–

190° C. for 9½ hours and air, dried by passage through calcium chloride and sulfuric acid, was bubbled through. There was obtained a light yellow moderately viscous resin which, on standing overnight set to a clear bubble-less light yellow rubbery gel.

*Example 3.*—Di-n-butyl diethoxy silane was prepared by the process described in Example 1, but using 312 g. ethyl orthosilicate (1.5 moles), 73 g. magnesium metal turnings (3 moles), 500 cc. anhydrous diethyl ether, and 411 g. butyl bromide (3 moles) added over a period of 2 hours. Fractionation of the decanted liquid phase of the reaction yielded n-$(C_4H_9)_2Si(OC_2H_5)_2$, a clear colorless pleasant-smelling liquid boiling at 214–216° C.

16 g. of this material was treated by a fine stream of dry air being bubbled through it over a period of 9½ hours at 170–190° C. There was obtained 8 g. of a very viscous, clear colorless resin. A film poured of the material was clear and hard after several hours' baking at 120° C.

*Example 4.*—Monomethyl tri n-butoxy silane was obtained by treating monomethyl trichlorosilane with excess n-butanol under anhydrous conditions. The monomethyl trichlorosilane was prepared by a process wherein equimolecular quantities of silicon tetrachloride and magnesium in anhydrous diethyl ether were treated with methyl bromide gas. Fractionation of the liquid ether solution phase of the reaction gives better than 65% yields of monomethyl trichlorosilane,

$CH_3SiCl_3$ boiling at 63–65° C.

37 k. of monomethyl trichlorosilane (.25 mole) was then refluxed with 62.5 g. n-butanol (.85 mole) under anhydrous conditions for two hours. During the refluxing, a copious amount of hydrogen chloride was evolved and escaped through the calcium chloride drying tube on the reflux condenser. The reaction mixture was fractionated and the portion boiling 235–238° C. was collected as $CH_3Si(O.C_4H_9-n)_3$.

Air, dried by passage over calcium chloride and through concentrated sulfuric acid, was bubbled into monomethyl tributoxy silane as prepared above, at 170–190° C. for 9½ hours and then at 130–150° C. for 12 hours. The resulting product was a clear orange moderately viscous liquid.

*Example 5.*—Monomethyl triethoxy silane was obtained by refluxing monomethyl trichlorosilane, prepared as in Example 4, with a large excess of absolute ethanol under anhydrous conditions for 2 hours. Fractionation of the reaction mixture yielded $CH_3Si(OC_2H_5)_3$, a clear pleasant smelling mobile liquid, boiling at 149–151° C.

This material was placed in an oil bath maintained at 130–145° C. and aerated for 12 hours, by blowing air through. At the end of that time, it was a clear yellow viscous liquid which set to a hard brittle resin on being heated in an oven at 70° C. for 5 hours.

*Example 6.*—Monophenyl triethoxy silane was prepared by the method of Example 1, employing bromobenzene as the aryl halide. There was obtained $C_6H_5Si(OC_2H_5)_3$, a clear, colorless, liquid which boiled at 117° C. at a pressure of 10 mm.

20 parts of this material was heated for 12 hours at 170–180° C. while air, dried by passage through calcium chloride and concentrated sulfuric acid, was slowly bubbled through. The liquid became very viscous. The liquid, whose viscosity was reduced with xylol, gave a hard, somewhat brittle film on baking a thin layer on glass at 150° C. for 6 hours.

*Example 7.*—Monocyclohexyl triethoxy silane was prepared by the method of Example 1, employing cyclohexyl bromide as the cyclic halide. There was obtained cyclohexyl triethoxy silane, a clear, colorless liquid which boiled at 228° C.

20 parts of this material was heated for 6 hours at 170–180° C. while air dried by passage through calcium chloride and concentrated sulfuric acid, was slowly bubbled through. The liquid became very viscous. The liquid, whose viscosity was reduced with xylol, gave a hard, tough film on baking a thin layer on glass at 150° C. for 2 hours.

*Example 8.*—N-butyl triethoxy silane was prepared by the method of Example 1, employing n-butyl bromide as the alkyl halide. There was obtained $C_4H_9Si(OC_2H_5)_3$, a clear, colorless liquid which boiled at 190–195° C.

20 parts of this material having 0.10% vanadium pentoxide suspended therein was heated for 6 hours at 150–160° C. while air, previously dried by passage through calcium chloride and concentrated sulfuric acid, was slowly bubbled through. The liquid became very viscous. The liquid, whose viscosity was reduced with xylol, gave a hard, brittle film on baking a thin layer on glass for 4 hours at 150° C.

*Example 9.*—N-butyl triethoxy silane was prepared by the method of Example 1, employing n-butyl bromide as the alkyl halide. There was obtained $C_4H_9Si(OC_2H_5)_3$, a clear, colorless liquid which boiled at 190–195° C.

20 parts of this material was heated for 6 hours at 150–160° C. while ozone, dried by passage through calcium chloride and concentrated sulfuric acid, was slowly bubbled through. The liquid became very viscous. The liquid, whose viscosity was reduced with xylol, gave a hard, somewhat brittle film on baking a thin layer on glass at 150° C. for 5 hours.

As indicated above, the alkoxy silicons may be oxidized to form polymers, from compositions containing the alkoxy silicons in admixture with other ingredients. Such additional ingredients may include silicon derivatives other than the alkoxy silicons. If the additional silicon derivatives are compounds which will undergo polymerization or partial polymerization, under the oxidative treatment, then copolymers may be obtained. For this purpose, the additional derivatives may be esters of silicic acids such as esters of orthosilicic acid or of silico formic acid. The following examples will illustrate such copolymer production, for example, from a mixture of alkyl siliconates or mixtures of alkoxysilanes (esters of ortho silico formic acid) and alkyl siliconates.

*Example 10.*—A mixture of 10 parts of monobutyl triethoxy silane $BuSi(OC_2H_5)_3$, and 10 parts of tetra ethyl ortho silicate $Si(OC_2H_5)_4$ was heated at 150–160° C. for 5 hours while slowly bubbling in air which was dried by previously passing through anhydrous calcium chloride and sulfuric acid. A pale colored, viscous syrup was secured which was reduced with xylol to 70% solids. A film baked for 6 hours at 150–160° C. was hard and brittle.

*Example 11.*—A mixture of 10 parts of monobutyl triethoxy silane $BuSi(OC_2H_5)_3$, and 10 parts of dibutyl diethoxy silane $Bu_2Si(OC_2H_5)_2$ was heated at 170–180° C. for 6 hours while slowly bubbling in air which was dried by previously passing through anhydrous calcium chloride and sulfuric acid. A pale colored, viscous syrup was secured which was reduced with xylol to 75% solids. A film baked for 6 hours at 150–160° C. was hard and tough.

Example 12.—A mixture of 10 parts of monobutyl triethoxy silane BuSi(OC$_2$H$_5$)$_3$, and 10 parts of tris beta chloroethoxy silane $$H-Si(OCH_2CH_2Cl)_3$$

was heated at 180–200° C. for 7½ hours while slowly bubbling in air which was dried by previously passing through anhydrous calcium chloride and sulfuric acid. A pale colored syrup was secured which was reduced to 70% solids. A film baked for 10 hours was hard and tough.

Materials of the present invention may be used in lacquers, or adhesives, either alone, or in mixture with other completely reacted or potentially reactive compounds. Such compounds may include resins such as rosin, copal, shellac and so forth, as well as synthetic resins including urea aldehyde resins, phenol aldehyde resins, melamine resins, aniline aldehyde resins, acetone formaldehyde resins, alkyd resins, cumarone resins, polymerized vinyl derivatives and vinyl resins, polymerized acrylic derivatives, including the esters of acrylic and methacrylic acids and so forth.

The silicon derivatives may be employed as textile finishing compositions to render the textiles hydrophobic. They may also be applied to ceramics or metals, especially those materials naturally containing a thin oxide coating. Conversion products of the present invention may be used on textiles to produce waterproofing, creaseproofing, wrinkleproofing, and the like, and to render rayons slip proof.

The derivatives of the present invention may be used in lubricating oils, or as lubricating oils, or as additives to hydrocarbon oils such as lubricating oils and also for inclusion with vegetable oils, particularly the drying oils such as linseed oil and China-wood oil, and the semi-drying oils such as soya bean oil and so forth, as well as the non-drying oils including castor oil and so forth. These derivatives may be introduced into the oils by blending or cooking them with such oils.

Products of the present invention may be used in the production of heat transfer liquids since they possess in general excellent heat stability. In view of their excellent electrical properties, they may be utilized in the production of varnishes, coatings, or coated articles for electrical insulation, and the liquid materials may be used as dielectrical liquids, etc. They may be used in the production of laminated products for bonding together two or more sheets of the same or different organic or inorganic materials. They may be employed also as plasticizers and binders and their utilization for such purposes may be controlled by the number of alkyl or aryl or similar constituents introduced into the derivatives.

Products of the present invention may be utilized in compositions either with or without resins as set forth above and with or without solvents in the production of lacquers and coating compositions. They may similarly be used in the production of molded articles as in the production of hot pressed products, with or without fillers incorporated into the compositions either before or after removal of solvents and then subjecting the compositions to hot pressing operations.

Having thus set forth our invention, we claim:

1. The method of preparing organo silicon derivatives which comprises subjecting an alkoxy hydrocarbon silane containing at least 1 carbon to silicon bond in which the sum of the hydrocarbon and alkoxy groups is 4, and the hydrocarbon groups from 1 to 2 in number, maintained in the liquid state, to the action of dry oxygen blown therethrough at a temperature above 130° C. until a polymeric organic silicon derivative is obtained, and discontinuing the reaction at that stage.

2. The method as set forth in claim 1, in which the hydrocarbon is alkyl.

3. The method of preparing organo silicon derivatives which comprises subjecting an alkoxy hydrocarbon silane containing at least one carbon to silicon bond in which the sum of the hydrocarbon and alkoxy groups is 4, and the hydrocarbon groups from 1 to 2 in number, maintained in the liquid state, to the action of dry air blown therethrough at a temperature above 130° C., until a polymeric organic silicon derivative is obtained, and discontinuing the reaction at that stage.

4. The method as set forth in claim 3, in which the hydrocarbon is alkyl.

5. The method as set forth in claim 1, followed by heat treatment of the resulting product in the absence of air.

6. The method as set forth in claim 3, followed by the step of baking the resulting polymer.

7. A method as set forth in claim 1, in which the treatment is carried out in successive stages at different temperature.

8. An oxidation polymer of an organo-substituted alkoxy silane produced by the method of claim 1.

9. An oxidation polymer of an alkoxy alkyl silane produced by the method of claim 1.

10. The method of preparing organo silicon derivatives which comprises subjecting monobutyl triethoxy silane to the action of dry air blown therethrough at a temperature of from 130–200° C. until a polymeric derivative is obtained and discontinuing the reaction at that stage.

11. The method of preparing organo silicon derivatives which comprises subjecting monobutyl triethoxy silane in admixture with tetraethyl ortho silicate each silicon derivative being present in substantial amount to the action of dry air blown therethrough at a temperature of from 150 to 160° C. until a polymeric derivative is obtained and discontinuing the reaction at that stage.

12. The method of preparing organo silicon derivatives which comprises subjecting monobutyl triethoxy silane in admixture with dibutyl diethoxy silane each silicon derivative being present in substantial amount to the action of dry air blown therethrough at a temperature of from 170 to 180° C. until a polymeric derivative is obtained and discontinuing the reaction at that stage.

13. The method of preparing organo silicon derivatives which comprises subjecting monobutyl triethoxy silane in admixture with tris beta chloro ethoxy silane each silicon derivative being present in substantial amount to the action of dry air blown therethrough at a temperature of from 180 to 200° C. until a polymeric derivative is obtained and discontinuing the reaction at that stage.

14. An oxidation polymer of monobutyl triethoxy silane produced by the method of claim 10.

15. An oxidation polymer of a mixture of monobutyl triethoxy silane and tetraethyl ortho silicate produced by the method of claim 11.

16. An oxidation polymer of a mixture of monobutyl triethoxy silane and dibutyl diethoxy silane produced by the method of claim 12.

17. An oxidation polymer of a mixture of monobutyl triethoxy silane and tris beta chloro ethoxy silane produced by the method of claim 13.

18. The method of preparing organo silicon derivatives which comprises subjecting an alkoxy hydrocarbon silane containing at least one carbon to silicon bond, in which the sum of the hydrocarbon and alkoxy groups is 4, and the hydrocarbon groups from 1 to 2 in number maintained in the liquid state, to the action of dry oxygen blown therethrough at a temperature of from 130 to 200° C. until a polymeric derivative is obtained and discontinuing the reaction at that stage.

19. The method of claim 18, in which the hydrocarbon group is alkyl.

JOHN E. RUST.
CHARLES A. MacKENZIE.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,371,050 | Hyde | Mar. 6, 1945 |
| 2,377,689 | Hyde | June 5, 1945 |
| 2,396,692 | Garner | Mar. 19, 1946 |
| 2,415,389 | Hunter et al. | Feb. 4, 1947 |

OTHER REFERENCES

Andrianov: Russian (Soviet) Patent 55,899, Oct. 31, 1939, translation, "Organo Silicon Literature," by Dow Corning Co., 3 pp.